United States Patent [19]
Hong

[11] Patent Number: 5,949,590
[45] Date of Patent: Sep. 7, 1999

[54] ACTUATOR FOR OPTICAL PICKUP APPARATUS

[75] Inventor: Sung Pyo Hong, Seoul, Rep. of Korea

[73] Assignee: LG Electronics, Inc., Seoul, Rep. of Korea

[21] Appl. No.: 08/774,221

[22] Filed: Dec. 27, 1996

[30] Foreign Application Priority Data

Dec. 29, 1995 [KR] Rep. of Korea ................ 95-67351
Dec. 29, 1995 [KR] Rep. of Korea ................ 95-67353

[51] Int. Cl.[6] ................................................. G02B 7/02
[52] U.S. Cl. ................................. 359/814; 359/824
[58] Field of Search ............................ 359/813, 814, 359/824

[56] References Cited

U.S. PATENT DOCUMENTS

| 4,861,138 | 8/1989 | Suzuki | 359/814 |
| 5,506,732 | 4/1996 | Mori | 359/824 |
| 5,659,525 | 8/1997 | Miyamae et al. | 359/814 |
| 5,663,840 | 9/1997 | Matsui | 359/814 |

*Primary Examiner*—Loha Ben
*Attorney, Agent, or Firm*—Birch, Stewart, Kolasch & Birch, LLP

[57] ABSTRACT

An improved actuator for an optical pickup apparatus which is capable of increasing the efficiency of a focusing coil and tracking coil by arranging the focusing coil and tracking coil in the same plane and disposing more than at least one permanent magnet in order for a plurality of poles to be alternately generated thereby, for thus improving an operation efficiency of an optical pickup apparatus for a high density optical disc which has been made to be operated at a high speed. The actuator includes a bobbin including an objective lens, back yokes disposed at both sides of the bobbin, a plurality of permanent magnets arranged in one side of each back yoke in order for the poles thereof to be differently and alternately formed, and a plurality of tracking coils and focusing coils arranged in a portion of the permanent magnets of the bobbin.

33 Claims, 13 Drawing Sheets

ACTUATOR FOR OPTICAL PICKUP APPARATUS

BACKGROUND OF INVENTION

1. Field of the Invention

The present invention relates to an actuator for an optical pickup apparatus, and in particular to an improved actuator for an optical pickup apparatus which is capable of increasing the efficiency of a focusing coil and tracking coil by arranging the focusing coil and tracking coil in the same plane and disposing more than at least one permanent magnet in order for a plurality of poles to be alternately generated thereby, for thus improving the efficiency of an optical pickup apparatus for a high density optical disc which has been made to be operated at a high speed.

2. Description of the Background Art

Generally, the actuator is a device for performing focusing and tracking operations for an optical pickup apparatus.

In addition, the focusing operation is directed to focusing a beam onto anhoptiical disc surface by upwardly and downwardly moving an objective lens and maintaining a predetermined distance between the objective lens and the optical disc, and the tracking operation is directed to urging the beam passed through the objective lens to track the optical disc by leftwardly and rightwardly moving the objective lens.

Generally, many methods use electric magnetic forces generated between the permanent magnet and coils for focusing and tracking operations based on the objective lens.

FIG. 1 is a perspectives view illustrating the construction of a conventional actuator, FIG. 2A is a cross-sectional view taken along line IIa—IIa of FIG. 1, FIG. 2B is a cross-sectional view taken along line IIb—IIb of FIG. 2A, FIG. 2C is a cross-sectional view taken along line IIc—IIc of FIG. 2A, and FIG. 2D is a cross-sectional view taken along line IId—IId. of FIG. 2A.

As shown therein, a frame 2 is disposed in a portion of the upper surface of a plate-shaped yoke 1. End portions of two wires 4 are internally connected to a portion of the frame 2.

Other end portions of the two wires 4 are connected to a bobbin 5 having an objective lens 6.

In addition, back yokes 9a are spaced-apart with respect to the bobbin 5 on the yoke 1.

Permanent magnets 10 and 10' are attached to each lateral surface of the back yokes 9 and 9a the lateral surfaces of which are opposite to the bobbin 5. The focussing coil 7 is wound onto the bobbin 5.

Tracking coils 8L, 8R and 8L', 8R' are arranged opposite to the permanent magnets 10 and 10' in both shorter sides of the focusing coil 7 being opposite to the permanent magnets 10 and 10', and the tracking coils BL, 8R and 8L', 8R, are rectangularly wound thereonto.

In addition, inner back yokes 11 and 11a, which are integral with the yoke, are disposed between the focusing coil 7 to which the tracking coils 8L, 8R are attached and the bobbin 5.

Namely, the conventional actuator for an optical pickup apparatus basically includes a driving section having the bobbin, the focusing coil 7 disposed in the bobbin 5, and the tracking coils 8L, 8R, and 8L', 8R'.

The permanent magnets 10 and 10' attached to the back yokes 5 and 9a, as shown in FIGS. 2A and 2B, are arranged in order for the N-pole to be opposite to the bobbin 5, and the magnetic fluxes from the permanent magnets 10 and 10' pass through the tracking coils 8L, 8R and 8L', 8R' , the focusing coil 7, and the inner back yoke 11 and 11a, for thus forming a magnetic circuit.

In the drawings, reference:numeral 3 denotes a substrate.

The operation of the conventlonal actuator for an optical pickup apparatus will now be explained.

The operation for adjusting the distance between the objective lens 6 and the optical disc by upwardly and downwardly moving the bobbin 5 will now be explained.

First, since the magnetic fluxes generated by the permanent magnets 10 and 10' vertically flow with respect to the lengthy side of the focusing coil 7, the bobbin 6 is moved in the +Z direction or −Z direction as the focusing coil 7, as shown in FIGS. 2A and 2B, receives the moving force in the +z direction and −Z direction based n the flowing direction of the current applied to the focusing coil 7.

Therefore, the objectiive lens 6 disposed in the bobbin 5 is moved in the Z direction, for thus focusing the beam.

The principle oft the tracking operation will now be explained.

The current flowing directions of two tracking coils 8L, 8R being opposite to the permanent magnet 10 are opposite.

Therefore, the current flowing directions at a right side of the left side tracking coil 8L and a left side of the right side tracking coil 8R, as shown in FIG. 2D, are the same, so that the tracking coils 8L, 8R receive a force in the Y-axis direction as shown in FIG. 2B.

The tracking coils 8L and 8R receiving the above-described forces are integrally moved together with the bobbin 5 When the force is applied to the tracking coils 8L, 8R, the objective lens 6 is leftwardly and rightwardly moved by the movement of the bobbin 5, for thus pertforming the tracking operation.

The movement of the tracking coils 8L', 8R' is performed in the above-described manner as well.

However, the usage efficiency of the tracking coils 8L, 8R and 8L', 8R' are low in the conventional actuator for an optical pickup apparatus.

Namely, since there are only a small right side portion of the left side tracking coil 8L and a small left side portion of the right side tracking coil 8R which portions are actually used for the tracking operation of the tracking coils 8L and 8R, the remaining portions of the tracking coils 8L, 8R are not used for the tracking operation.

In addition, since the tracking coils 8L, 8R are overlapped on the upper surface of the focusing coil 7, the length of an efffective air gap may be made longer, for thus decreasing the average magnetic flux density of the coils.

Furthermore, in the conventional actuator for an optical pickup apparatus, since the magnetic flux lines FL are formed as shown in FIG. 2A, the inner back yokes 11 and 11a are necessary. Since the above-described inner back yokes 11 and 11a are fixedly used, it is necessary to form an air gap between the bobbin 5, which is a driving section, and the focusing coil 7, so that the bobbin 5 is made bulky, and the length of the focusing coil 7 is made longer.

SUMMARY OF THE INVENTION

Accordingly, it is an object of the present invention to provide an actuator for an optical pickup apparatus which overcomes the aforementioned problems encountered in the conventional art.

It is another object of the present invention to provide an actuator for an optical pickup apparatus which is capable of increasing the efficiency of a focusing coil and tracking coil by arranging the focusing coil and tracking coil in the same plane and disposing more than at least one permanent magnet in order for a plurality of poles to be alternately generated thereby, for thus improving the efficiency of an optical pickup apparatus for a high density optical disc which has been made to be operated at a high speed.

To achieve the above objects, in accordance with a first embodiment of the present invention, there is provided an actuator for an optical pickup apparatus, which includes a bobbin including an objective lens, back yokes disposed at both sides of the bobbin, a plurality of permanent magnets arranged in one side of each back yoke in order for the poles thereof to be differently and alternately formed, and a plurality of tracking coils and focusing coils arranged in a portion of the permanent magnets of the bobbin.

To achieve the above objects, in accordance with a second embodiment of the present invention, there is provided an actuator for an optical pickup apparatus, which includes a passing-through groove formed in a center portion of a bobbin having an objective lens, focusing coils and tracking coils arranged in the same plane in the passing-through groove and attached to the bobbin, a back yoke being opposite to the focusing coils and tracking coils, and permanent magnets having poles which are alternately arranged toward the focusing coils and trcking coils of the back yoke.

To achieve the above objects, in accordance with a third embodiment of the present invention, there is provided an actuator for an optical pickup apparatus, which includes a bobbin having an objective lens, permanent magnets having a first pole and a second pole, surrounding the first pole, a back yoke attached to the permanent magnets and being opposite to the focusing coils and tracking coils, focusing coils arranged in upper and lower portions of both sides of the bobbin, and tracking coils arranged at both sides of the bobbin, wherein the focusing coils and the tracking coils are arranged in the same plane.

To achieve the above objects, in accordance with a fourth embodiment of the present invention, there is provided an actuator for an optical pickup apparatus, which includes a bobbin having a groove internally formed in both ends thereof, a first pole arranged in a center portion of the back yoke, a second pole arranged in a back yoke and surrounding the first pole, focussing coils arranged in upper and lower portions of both sides of the bobbin, tracking coils arranged in both sides of the bobbin, with the focusing coils and the tracking coils being arranged in the same plane, and an inner back yoke disposed in each groove formed in the bobbin.

To achieve the above objects, in accordance with a fifth embodiment of the present invention, there is provided an actuator for an optical pickup apparatus, which includes a bobbin having an objective lens and a groove formed in the weight center thereof, a fine pattern (FP) coil disposed in the groove of the bobbin and having focusing coils and tracking coils which are arranged in the same plane, back yokes arranged in the groove of the bobbin and being opposite to the FP coil, and permanent magnets having first poles attached to a portion being opposite to the FP coil of the back yokes and second poles which are different from the first poles and surround the first poles.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
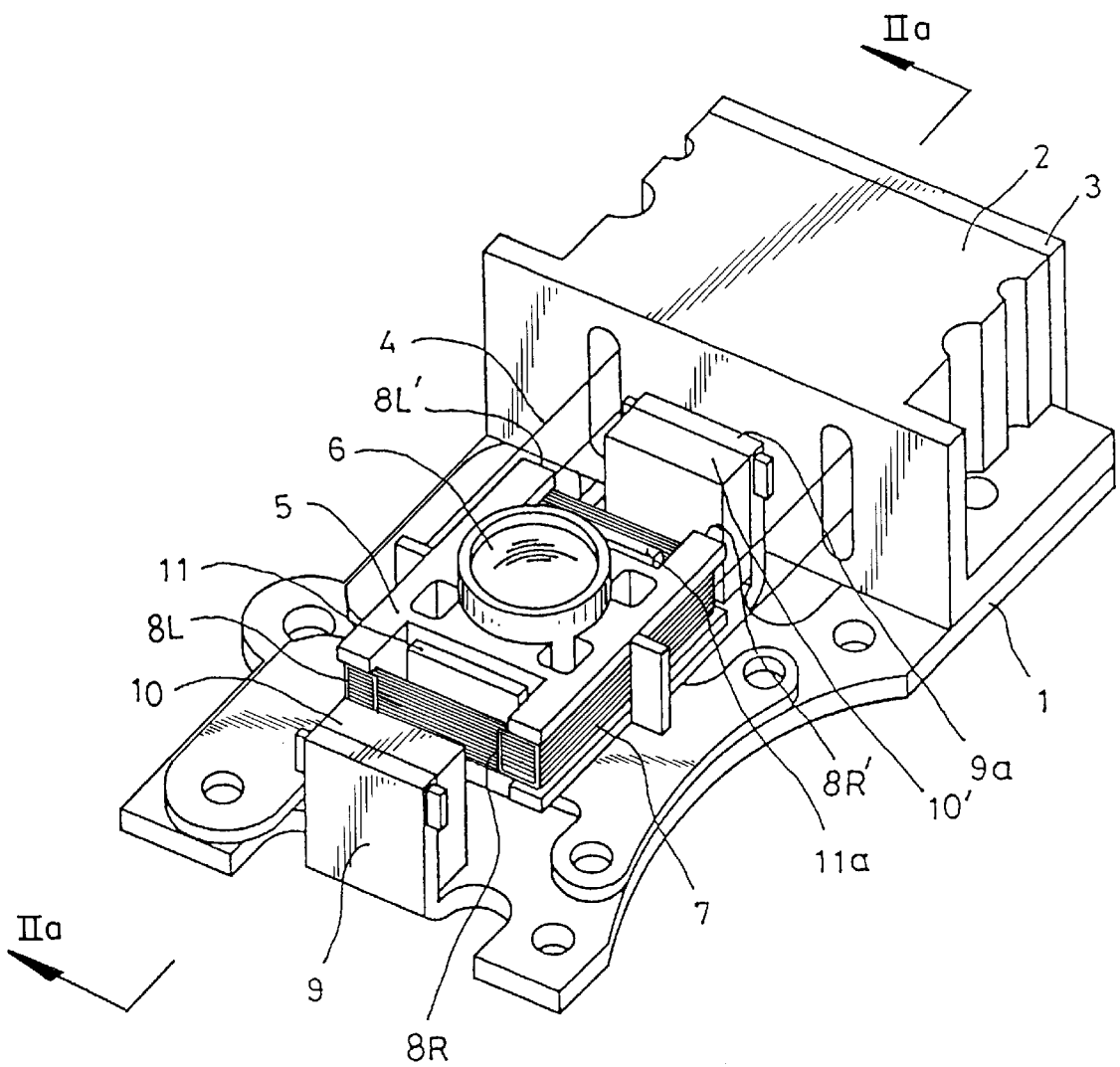
FIG. 1 is a perspective view illustrating the construction of a conventional actuator.
Figure 2A:
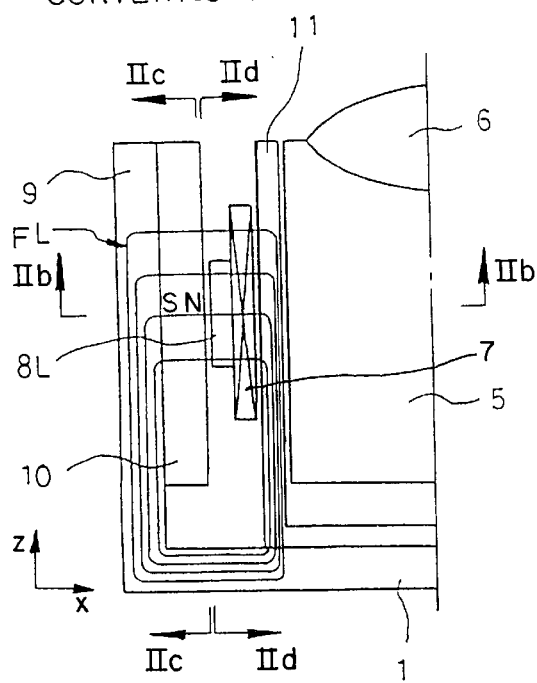
FIG. 2A is a cross-sectional view taken along line IIa—IIa of FIG. 1.
Figure 2B:
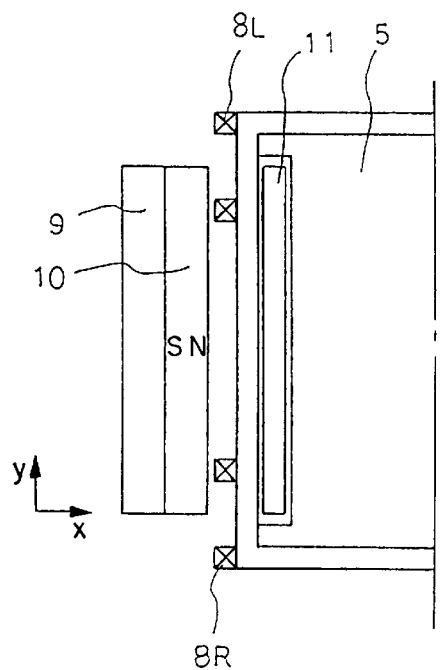
FIG. 2B is a cross-sectional view taken along line IIb—IIb of FIG. 2A.
Figure 2C:
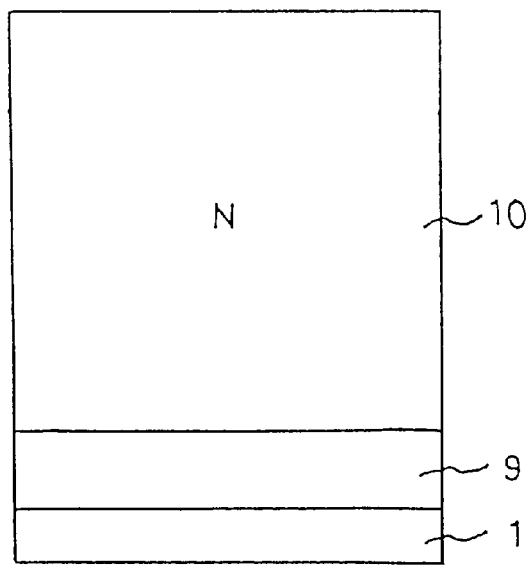
FIG. 2C is a cross-sectional view taken along line IIc—IIc of FIG. 2A.
Figure 2D:
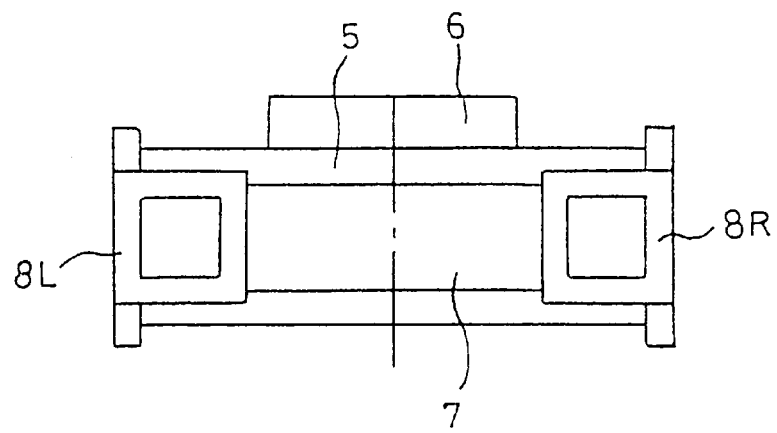
FIG. 2D is a cross-sectional view taken along line IId—IId of FIG. 2A.
Figure 3A:
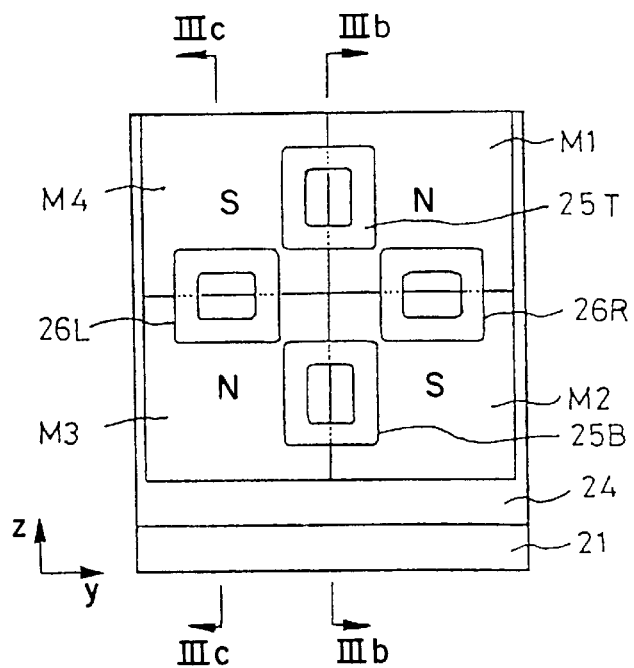
FIG. 3A is a cross- sectional view illustrating a back yoke when viewing from the lateral surface of a bobbin of an actuator according to a first embodiment of the present invention.
Figure 3B:
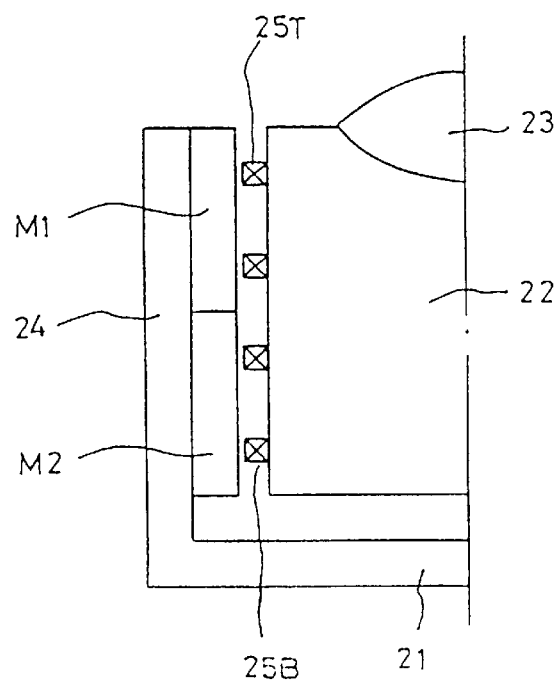
FIG. 3B is a cross-sectional view taken along line IIIb—IIIb of FIG. 3A.
Figure 3C:
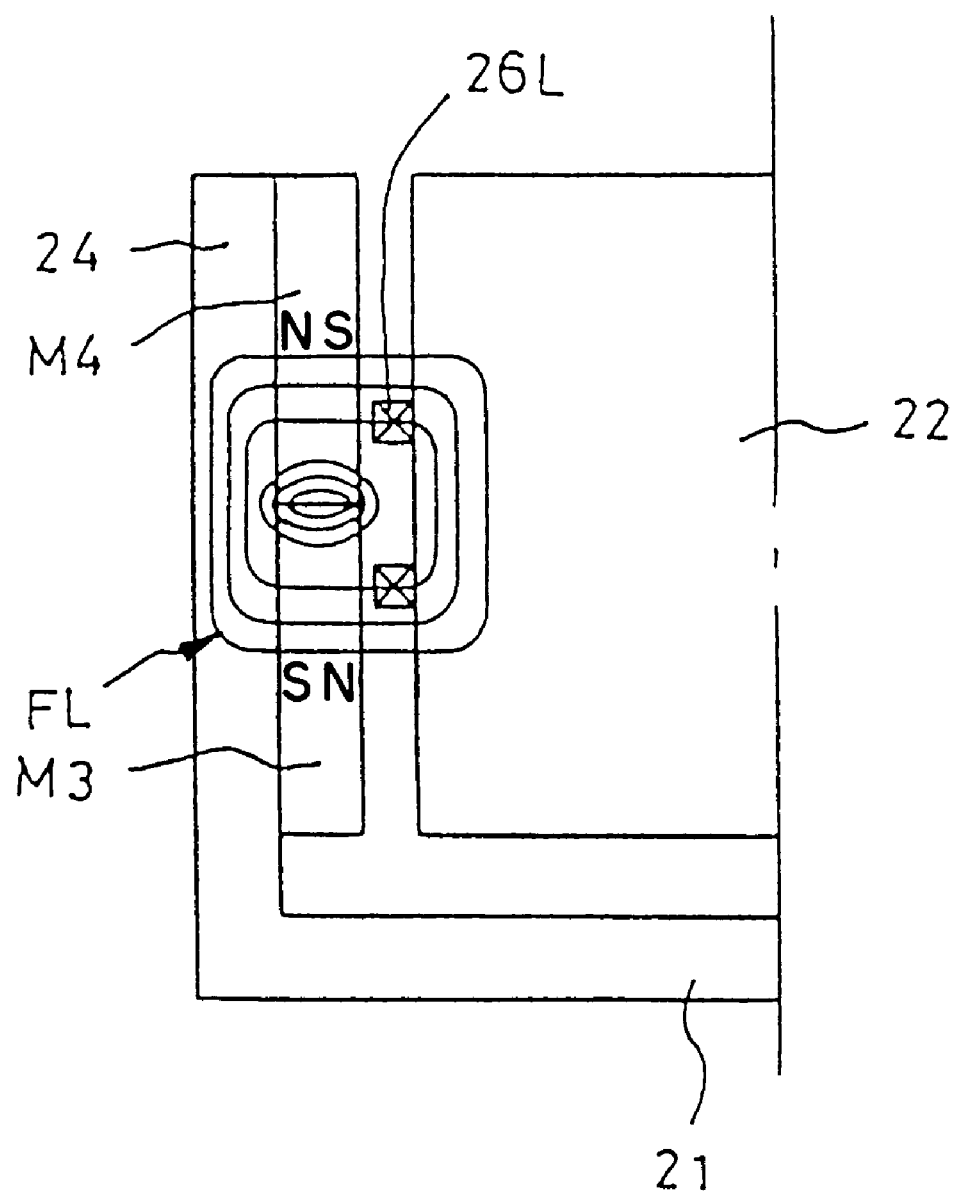
FIG. 3C is a cross-sectional view taken along line IIIc—IIIc of FIG. 3A.

FIG. 3A is a cross-sectional view illustrating a back yoke when viewing from the lateral surface of a bobbin of an actuator according to a first embodiment of the present invention, FIG. 3B is a cross-sectional view taken along line IIIb—IIIb of FIG. 3A, and FIG. 3C is a cross-sectional view taken along line IIIb—IIIb of FIG. 3A.

As shown therein, permanent magnets M1, M2, M3 and M4 are attached to an upper surface of a back yoke 24, which upper surface is opposite to a bobbin 22 of a back yoke 21, so that a plurality of poles can be alternately generated.

Here, four permanent magnets M1, M2, M3 and M4 attached to the back yoke 24 are rectangularly disposed. Each pole of the permanent magnets M1, M2, M3, and M4 neighbors with a different pole.

In more detail, as shown in FIG. 3A, the N-pole of the permanent magnet M1, the S-pole of the permanent magnet M1, the N-pole of the permanent magnet M3, and the S-pole of the permanent magnet M4, as shown in FIG. 3B, are arranged to be opposite to the bobbin 22, for thus generating magnetic flux lines FL in the X-axis direction asb shown in FIG. 3A.

In addition, the tracking coils 25T and 25B are wound onto the upper and lower portions of the bobbin 22 including an objective lens 23 and are opposite to the permanent magnets M1, M2, M3 and M4, and the focusing coils 26L and 26R are wound in both sides of the bobbin 22 in order for the focusing coils 26L and 26R to be in the same plane as the tracking coils 25T and 25B.

The tracking coils 25T and 25B and the focusing coils 26L and 26R are formed to be rectangular, each both sides of the tracking coils 25T and 25B and each both sides of the focusing coils 26L and 26R are oppositefto the different poles.

The bobbin 22 including the objective lens 23, the tracking coils 25T and 25B, and the focusing coils 26L and 26R form a driving section and are integrally moved.

In the actuator according to a first embodiment of the present invention, the magnetic flux lines FL generated by the permanent magnets M1, M2, M3 and M4 are formed as shown in FIG. 3C, and pass through the focusing coils 26L and 26R and the tracking coils 25T and 25B.

The operation of the actuator for an optical pickup apparatus according to a first embodiment of the present invention will now be explained.

First, the upward. and downward movements (in the Z-axis movement) of the bobbin 22 for a focusing, as shown in FIGS. 3A and 3B, are performed by the current flowing in the same direction in the upper and lower sides of the focusing coils 26L and 26R disposed at both sides the bobbin 22.

In more detail, if reversing the current flowing directions of the left side focusing coil 26L and the right side focusing coil 26, the focusing coils 26L and 26R receive a force in the upward and downward directions (in the Z-axis direction) by the current in the focusing coils 26L and 26R.

Therefore, the bobbin 22 onto which the focusing coils 26L and 26R are wound is upwardly and downwardly moved, for thus upwardly and downwardly moving the objective lens 23.

The tracking operation will now be explained.

As shown in FIG. 3B, if the different direction current is applied to the tracking coil 25T, and the tracking coil 25B wound onto both sides of the bobbin 22, the magnetic flux lines FL generated by the permanent magnets M1, M2, M3, and M4 vertically pass through the left and right sides of the tracking coils 25T and 25B. Therefore, the tracking coils 25T and 25B receive a force in the leftward and rightward direction (in the y-axis direction as shown in FIG. 3A) by the current being applied to the left and right sides of the tracking coils 25T and 25B.

Therefore, the bobbin 22 including the tracking coils 25T and 25B is leftwardly and rightwardly moved, and then the objective lens 23 disposed in the bobbin 22 is leftwardly and rightwardly moved, for thus performing a tracking.

As described above, in the first embodiment of the present invention, the portions of the tracking coils 25T and 25B which are used for the tracking are increased by two times, for thus increasing the usage efficiency of the tracking coils 25T and 25B. In addition, since the inner back yoke is not necessary, the number of parts is reduced.

The actuation for an optical pickup apparatus according to a second embodiment of the present invention will now be explained.

Figure 4A:
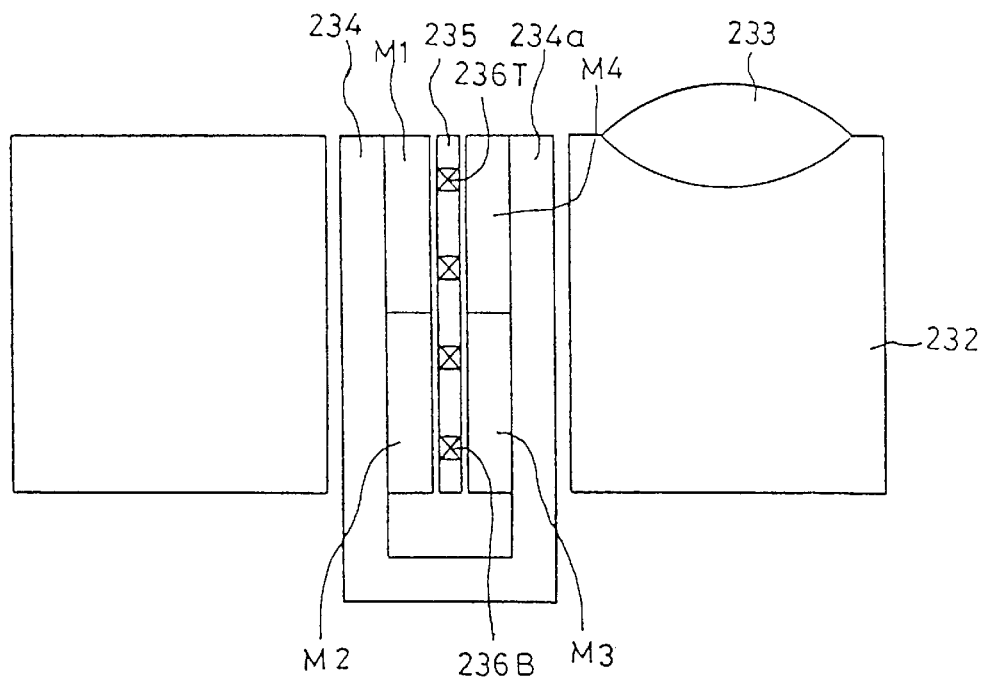
FIG. 4A is a vertical cross-sectional view illustrating an actuator according to a second embodiment of the present invention.
Figure 4B:
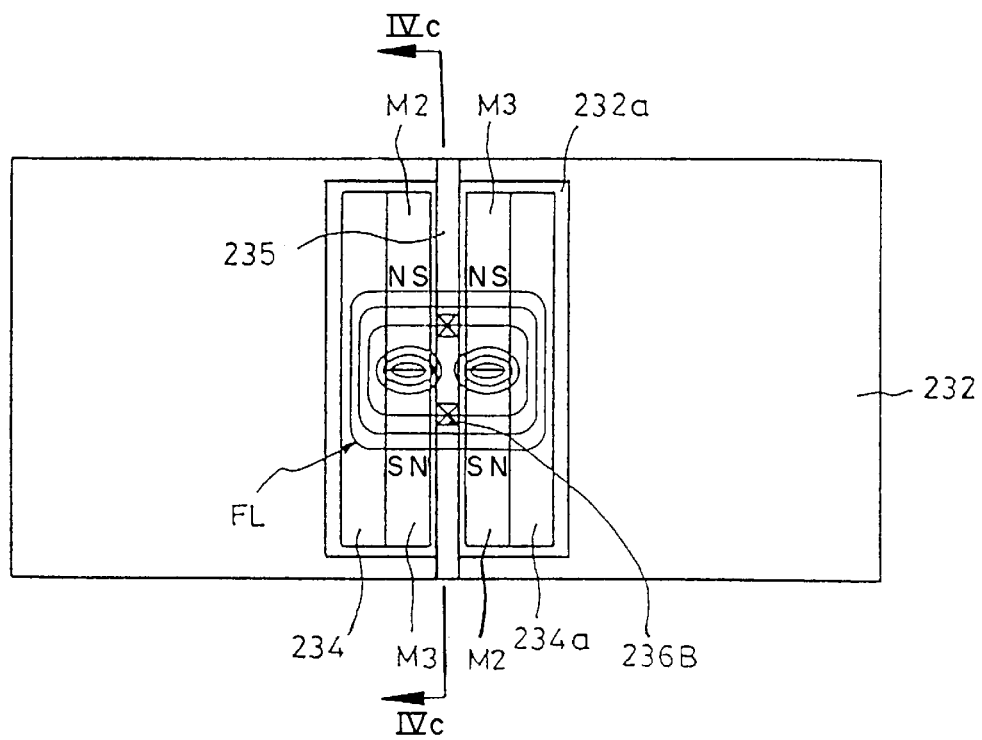
FIG. 4B is a horizontal cross-sectional view illustrating an actuator according to a second embodiment of the present invention.
Figure 4C:
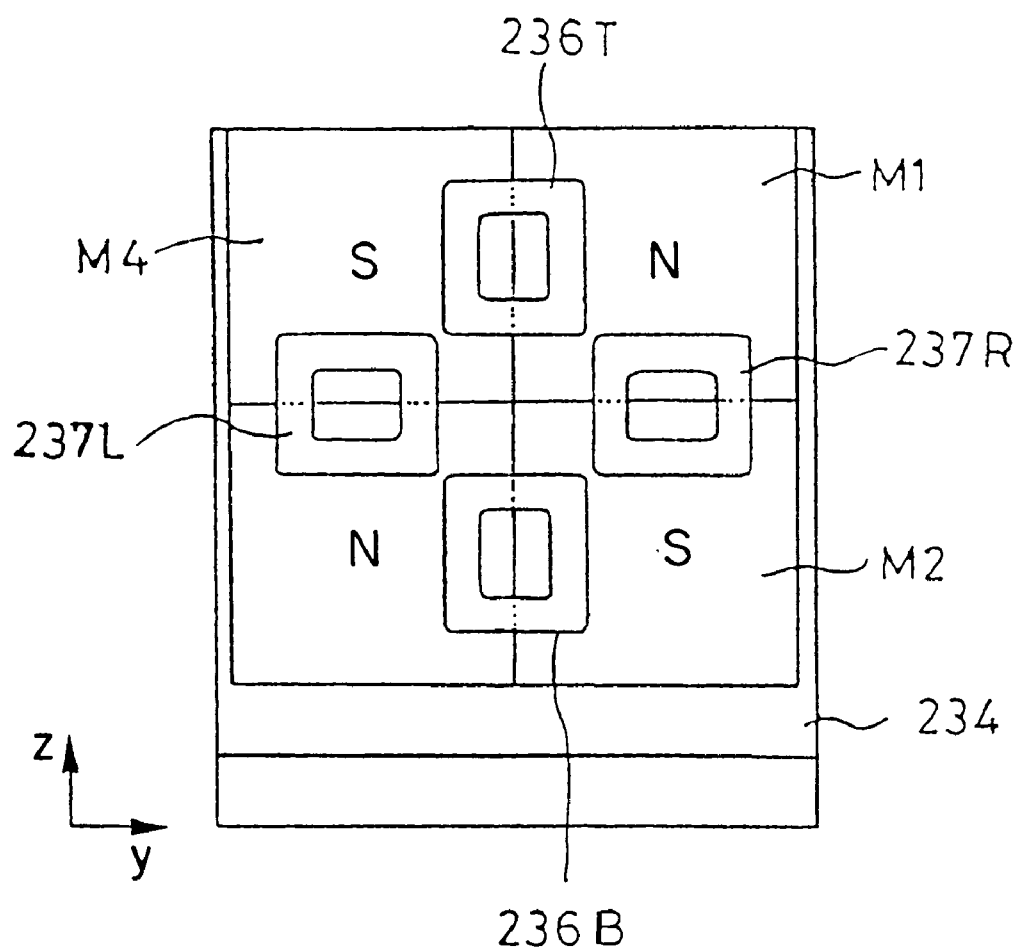
FIG. 4C is a cross-sectional view taken along line IVc—IVc of FIG. 4B.

First, as shown in FIGS. 4A through 4C, tracking coils 236T and 236B and focusing coils 237L and 237R are arranged in the same plane. An FP (Fine Pattern) coil 235 is arranged in the center portion of symmetrically spaced-apart bobbins 232.

As shown in FIG. 4B, permanent magnets M1, M2, M3, and M4 are attached to the lateral surface being opposite to the FP (Fine Pattern) coil 235 of a plurality of back yokes 234 and 234a each being opposite to a groove 232a formed in the bobbin 232 arranged at both sides of the FP (Fine Pattern) coil 235 in order for the poles thereof to be alternately arranged from each other.

In addition, the permanent magnets M1, M2, M3 and M4 attached to the back yokes 234 and 234a at both sides of the FP coil 235 are opposite to each other.

The permanent magnets M1, M2, M3 and M4 being opposite to the back yokes 234 and 234a are arranged to be rectangular, each pole of the permanent magnets M1, M2, M3, and M4 is opposite to the different pole.

Namely, the permanent magnets M1, M2, M3, and M4 are arranged in the same manner as the first embodiment.

In addition, the centers of the tracking coils 236T and 236B and the focusing coils 237L and 237R, as shown in FIG. 4C, are positioned in a portion matching with the boundaries of the permanent magnets M1, M2, M3 and M4, and the tracking coils 236T and 236B and the focusing coils 237L and 237R are formed to be rectangular.

The FP (Fine Pattern) coil 235 is attached to a portion of the bobbin 232.

Therefore, the magnetic flux lines FL passing through the tracking coils 236T and 23B, as shown in FIG. 4C, are formed in the X-axis direction and vertically passes through the tracking coils 236T and 236T.

Since the operation of the actuator for an optical pickup apparatus according to a second embodiment of the present invention is the same as the first embodiment of the present invention, no descriptions thereon will be provided.

In the actuator for an optical pickup apparatus according to the second embodiment of the present invention, the permanent magnets M1, M2, M3 and M4 are disposed at both sides of the FP coil 235, the magnetic flux density is significantly increased by the permanent magnets M1, M2, M3 and M4, for thus improving the operational characteristics of the apparatus.

In addition, since the portions of the tracking coils 236T and 236B which are used for the tracking are increased by two times compared to the conventional art, the usage efficiency of the tracking coils 236T and 236B is increased. In addition, the permanent magnets M1, M2, M3, and M4 are arranged at both sides of the FP coil 235 wherein the tracking coils 236T and 236B and the focusing coils 237L and 237R are arranged in the same plane, for thus reducing the length of the air gap and increasing the average magnetic flux density.

The actuator for an optical pickup apparatus according to a third embodiment of the present invention will now be explained.

Figure 5A:
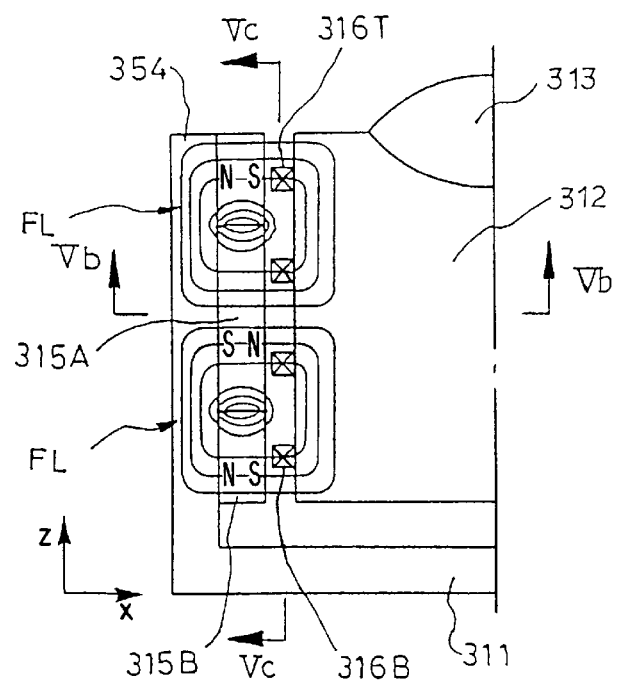
FIG. 5A is a cross-sectional view illustrating an actuator according to a third embodiment of the present invention.
Figure 5B:
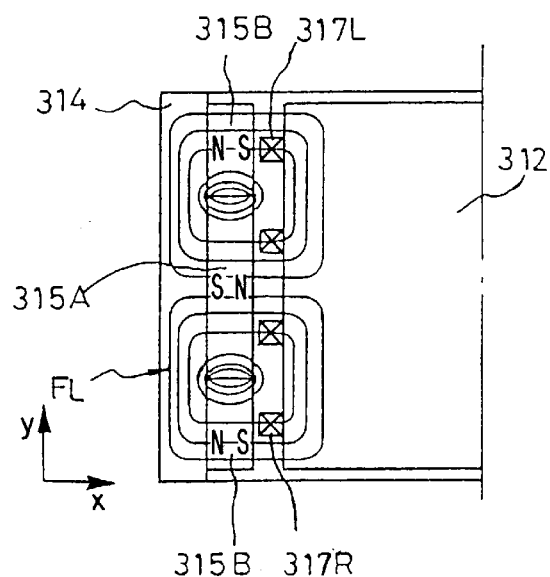
FIG. 5B is a cross-sectional view taken along line Vb—Vb of FIG. 5A.
Figure 5C:
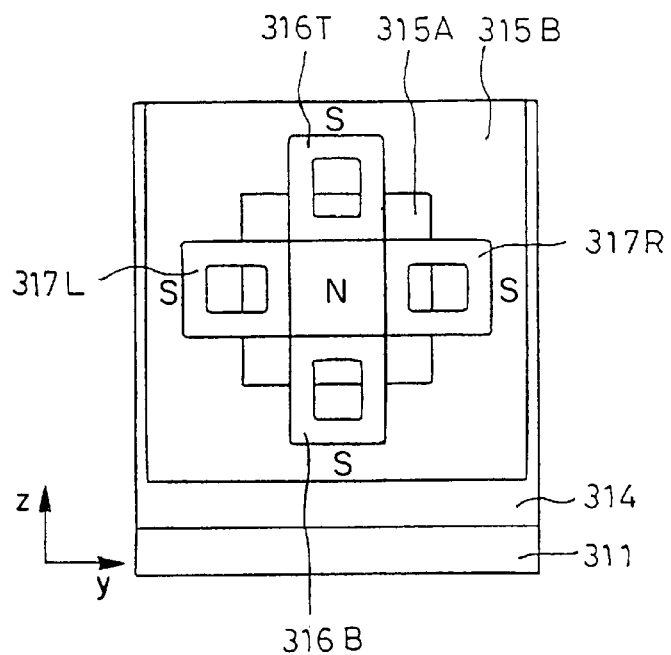
FIG. 5C is a cross-sectional view taken along line Vc—Vc of FIG. 5A.

As shown in FIGS. 5A through 5C, in the actuator for an optical pickup apparatus according to the third embodiment of the present invention, the shape of the permanent magnets of the first embodiment of the present invention is formed in order for the pole in the center portion of the permanent magnet 315A to be different from the permanent magnet 315B surrounding the center portion of the permanent magnet 315A.

Here, the shape of the center portion of the permanent magnet 315A is formed to be rectangular.

In addition, as shown in FIG. 5C focusing coils 316T and 316B are disposed at both sides of a bobbin 312 having an objective lens 313, and the focusing coils 316T and 316B and the tracking coils 317R and 317L are in the same plane in both sides of the bobbin 312.

The permanent magnets 315A and 315B are opposite to the bobbin 312 in order for the poles thereof to be different from each other.

In more detail, as shown in FIG. 5A, the N-pole is opposite to the bobbin 312 in the center portion of the permanent magnet 315A, and in the permanent magnet 315B surrounding the center portion of the permanent magnet 315A, the S-pole is opposite to the bobbin 312.

In addition, the centers of the focusing coils 316T and 316B and the tracking coils 317T and 317R which are arranged in the same plane is positioned in a portion matching with the boundaries in which different poles of the permanent magnets neighbor to each other, and the focusing coils 316T and 316B and the tracking coils 317T and 317R are arranged to be rectangular at both sides of the bobbin 312.

In the drawings, reference numeral 311 denotes a yoke.

The operation of the actuator. for an optical pickup apparatus according to the third embodiment of the present invention will now be explained.

First, the focusing operation which is performed by using the focusing coils 316T and 316B will now be explained.

As shown in FIG. 5A, magnetic field lines FL are formed in the focusing coils 316T and 316B by the permanent magnets 315A and 315B.

In addition, the magnetic field lines FL vertically pass through the upper and lower sides (all four sides) of the focusing coils 316T and 316B.

If reversing the current flowing direction of the focusing coils 316T and 316B, the upper and lower sides (all four sides) of the focusing coils 316T and 316B always receive moving force in the same direction, namely, in the Z direction and −D direction.

Therefore, since the focusing coils 316T and 316B are disposed in the side portion of the bobbin 312 having the objective lent 313, the bobbin 312 is moved in the Z and −Z directions that the focusing coils 316T and 316B receive the moving force.

In addition, the tracking operation by the tracking coils 317L and 317R will now be explained.

First, the magnetic field lines FL passed through the tracking coils 317L and 317R, as shown in FIG. 5B, vertically pass through the left and right sides (all four sides) of the tracking coils 317L and 317R disposed at both sides of the bobbin 312 having the objective lens 313.

If a current is applied to the tracking coils 317T and 317R in order for the tracking coils 317T and 317R, which current is applied thereto in the different direction, the left and right sides (all four sides) of the tracking coils 317L and 317R receive a moving force in the Y-axis and −Y-axis directions as shown in FIG. 5B.

Therefore, since the tracking coils 317L and 317R receive the force, the bobbin 312 to which the tracking coils 317L and 317R are fixed is moved in the Y-axis and −Y-axis directions.

The permanent magnets 315A and 315B and the focusing and tracking coils 316T, 316B and 317L, 317R are symmetric in this embodiment of the present invention. However, the arrangements thereof are not limited thereto. Any arrangements are preferably available in another embodiment of the present invention without departing from the scopes of claims of the present invention.

In the third embodiment of the present invention, since it is possible to use each two sides of the tracking coils 317L and 317R, it is possible to increase the usage efficiency of the tracking coils 317L and 317R, for thus enhancing the tracking operational efficiency of the apparatus.

In addition, in this embodiment of the present invention, since the inner back yoke is not necessary, the number of parts is reduced, and it is possible to decrease the possibility of defective parts and simplify the construction of the apparatus. Furthermore, the more compact bobbin may be made, for thus reducing the weight of the driving section.

An actuator for an optical pickup apparatus according to a fourth embodiment of the present invention will now be explained with reference to FIG. 6.

Since the construction of the fourth embodiment of the present invention is the same as the third embodiment, only the different elements will now be explained.

Namely, in the actuator for an optical pickup apparatus according to the fourth embodiment of the present invention, the focusing coils 426T and 426B and the tracking coils 427L and 427R are wound onto both sides of a bobbin (not shown) in the form of a trapezoid.

The lengthy sides of the focusing coils 426T and 426B and the tracking coils 427L and 427R wound in the form of a trapezoid are positioned in an outer side of the bobbin.

With the above-described constructions, since the left and right sides of the tracking coils 427L and 427R which are really used for the tracking operation and the upper and lower sides of the focusing coils 426T and 426B which are really used for the tracking operation are made longer, the coil usage efficiency is increased.

Figure 6:
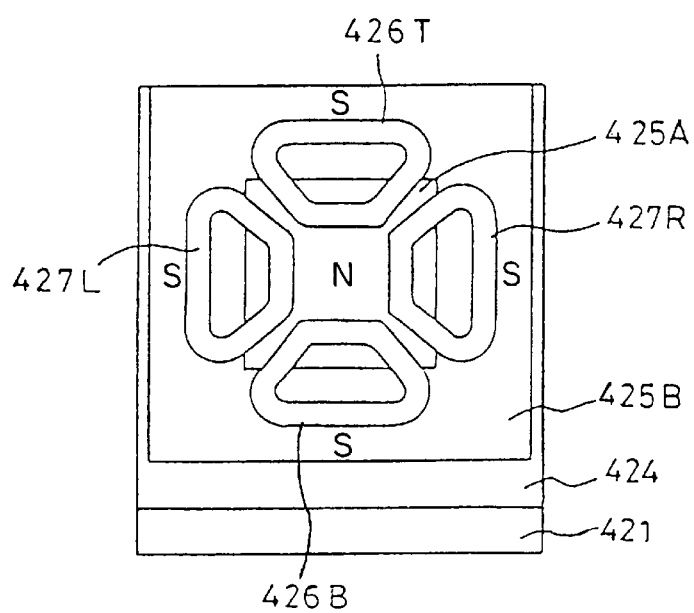
FIG. 6 is a cross-sectional view illustrating an actuator according to a fourth embodiment of the present invention.

In FIG. 6, reference numeral 424 denotes a back yoke, 425A denotes a center portion of the permanent magnet, and 425B denotes a center portion surrounded by the permanent magnets.

Since the operation principle of the fourth embodiment of the present invention is the same as the third embodiment, no descriptions thereon will be provided.

With the above-described constructions, it is possible to significantly increase the usage efficiency of the tracking coils. In addition, since the inner back yoke is not necessary, the same effects as the third embodiment can be achieved in the fourth embodiments of the present invention.

An actuator for an optical pickup apparatus according to a fifth embodiment of the present invention will now be explained.

Figure 7:
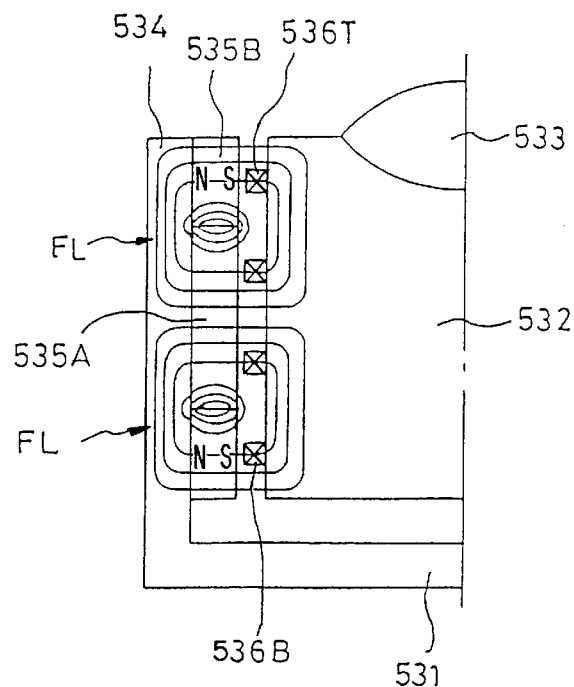
FIG. 7 is a cross-sectional view illustrating an actuator according to a fifth embodiment of the present invention.

As shown in FIG. 7, in the fifth embodiment of the present invention, a center portion of the permanent magnets is formed of a salient pole 535A made of a magnetic material.

The shape of a region 535B surrounding the salient pole 535A which is the center portion of the permanent magnets and the center portion of the permanent magnets is the same as the third embodiment.

In addition, in the fifth embodiment of the present invention having a magnetic flux formation section, focusing coils 536T and 536B and tracking coils (not shown) are symmetrically arranged in the same plane in both sides of a bobbin 532.

In FIG. 7, reference numeral 531 denotes a yoke, and 533 denotes an objective lens.

Since the operational principle of the actuator according to the fifth embodiment of the present invention is the same as the third embodiment, no descriptions thereon will now be provided.

In the fifth embodiment of the present invention, it is possible to increase the usage efficiency of the tracking coils. In addition, the size of the permanent magnets is reduced by using the salient pole in the center portion of the permanent magnet, for thus reducing the fabrication cost. Furthermore, Since the inner back yoke is not used, it is possible to achieve the same effects as the third embodiment.

In addition, in the fifth embodiment of the present invention, the salient pole may be preferably used for the region surrounding the center portion of the permanent magnets.

An actuator for an optical pickup apparatus according to a sixth embodiment of the present invention will now be explained.

Figure 8:
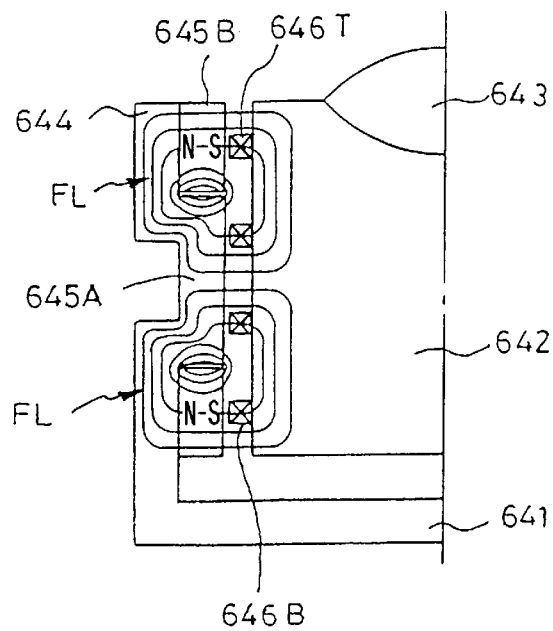
FIG. 8 is a cross-sectional view illustrating an actuator according to a sixth embodiment of the present invention.

As shown in FIG. 8, a back yoke 644 is protrudingly bent. Namely, the thusly protrudent portion is used for the center portion of the permanent magnet 645A which is formed of the salient pole of the fifth embodiment.

The back yoke 644 is protrudingly bent in the reverse direction of a bobbin 642 and is used for the salient pole which is formed of the center portion of the permanent magnets.

In addition, focusing coils 646T and 646B and tracking coils (not shown) are symmetrically arranged in the same plane in both sides of the bobbin 642.

The focusing coils 646T and 646B and the tracking coils (not shown) are wound onto both aides of the bobbin 642 in order for the permanent magnets 645B surrounding the permanent magnet 645A and the center portion thereof to be placed on the boundary between the focusing coils 646T and 646B and the tracking coils (not shown).

In the drawings, reference numeral 641 denotes a yoke, and 643 denotes an objective lens.

In addition, another construction of the sixth embodiment of the present invention is the same as the third embodiment and the operational principle thereof is the same as well.

In the sixth embodiment of the present invention, the usage efficiency of the tracking coil is significantly increased, and the size of the permanent magnets can be reduced, for thus reducing the fabrication cost of the apparatus, and the inner back yoke is not necessary compared to the conventional art.

An actuator for an optical pickup apparatus according to a seventh embodiment of the present invention will now be explained.

Figure 9A:
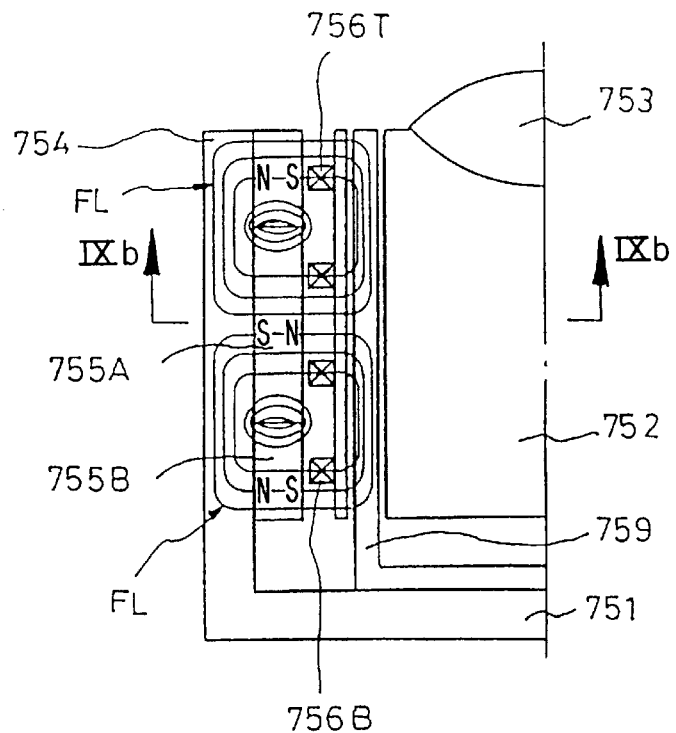
FIG. 9A is a cross-sectional view illustrating an actuator according to a seventh embodiment of the present invention.
Figure 9B:
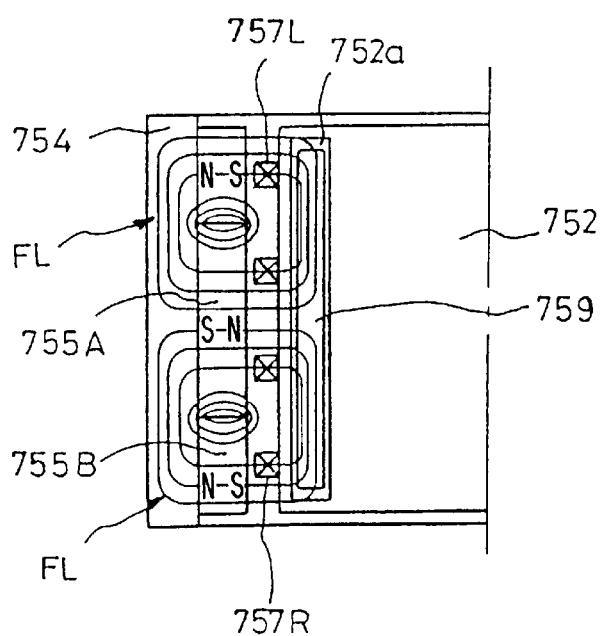
FIG. 9B is a cross-sectional view taken along IXb—IXb of FIG. 9A.

In the seventh embodiment of the present invention, as shown in FIGS. 9A and 9B, an inner back yoke 759 is additionally provided compared to the third embodiment of the present invention.

The inner back yoke 759 is disposed in a groove 752a formed in a bobbin 752, and is opposite to a back yoke 754.

Focusing coils 756T and 756B and tracking coils 757L and 757R are attached to the bobbin 752 being opposite to permanent magnets 755A and 755B.

In addition, the inner back yoke 759 is made of a magnetic material and is integrally formed on a yoke 751.

In FIG. 9A, reference numeral 753 denotes an objective lens.

Since the principle of the focusing and tracking is the same as the third embodiment, no descriptions thereon will now be provided.

In the seventh embodiment of the present invention, the usage efficiency of the tracking coils is increased, and since the length of the effective gap is made shorter, the average magnetic flux density is increased.

An actuator for an optical pickup apparatus according to an eighth embodiment of the present invention will now be explained.

Figure 10A:
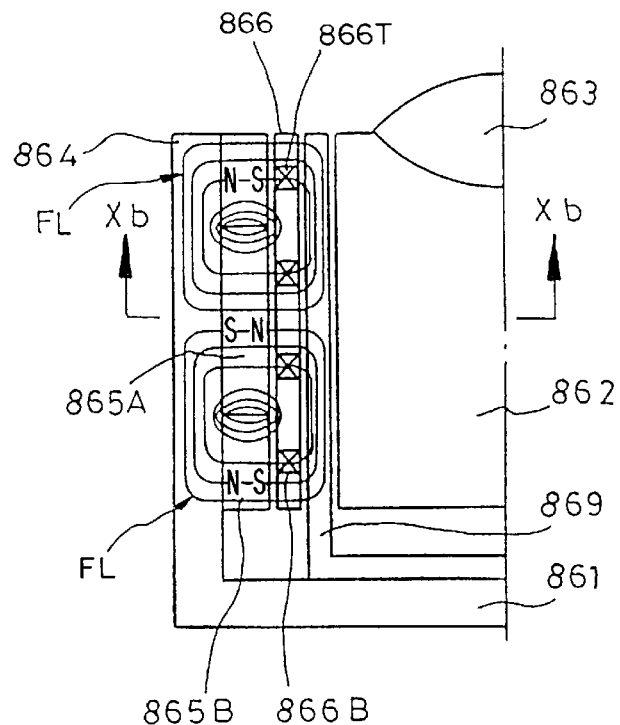
FIG. 10A is a cross-sectional view illustrating an actuator according to an eighth embodiment of the present invention.
Figure 10B:
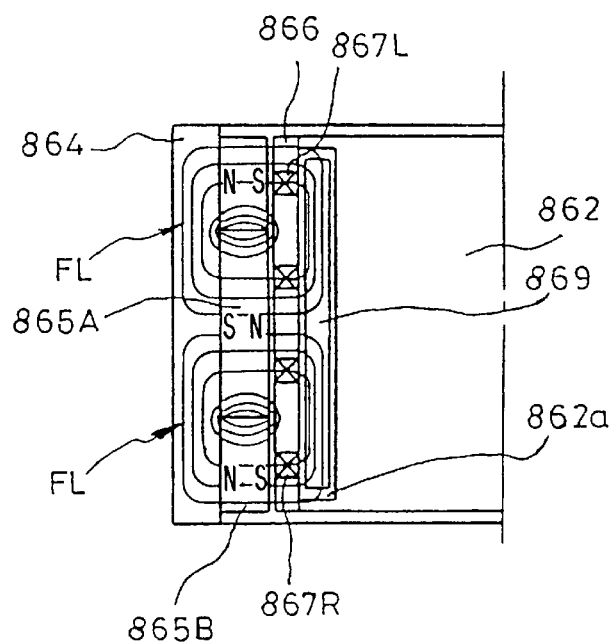
FIG. 10B is a cross-sectional view taken along line Xb—Xb of FIG. 10A.

As shown in FIGS. 10A and 10B, in the eighth embodiment of the present invention, an inner back yoke is opposite to a yoke in both sides of a bobbin. Focusing coils 866T and 866B and tracking coils 867L and 867R are formed together with an FP coil 866, and both ends of the FP coil 866 are attached to left and right portions of the bobbin 862 and is directly opposite to an inner back yoke 869.

In addition, the focusing coils 866T and 866B and the tracking coils 867L and 867R, which are integrally formed, are wound in a portion matching with the boundary in which different poles of the permanent magnets 865A and 865B neighbor with each other wherein the poles are different in the center portion of the permanent magnet 865A and a peripheral portion of the permanent magnet 865B.

In the drawings, reference numeral 861 denotes a yoke, 862a denotes a groove in which the inner back yoke is arranged, 863 denotes an objective lens, and 864 denotes a back yoke.

Since the remaining constructions and the focusing and tracking operation are the same as the seventh embodiment of the present invention, no descriptions thereon will now be provided.

In the eighth embodiment of the present invention, it is possible to increase the usage efficiency of the tracking coils, and since the length of the effective gap is made shorter, the average magnetic flux density is increased.

Finally, an actuator for an optical pickup apparatus according to a ninth embodiment of the present invention will now be explained.

Figure 11A:
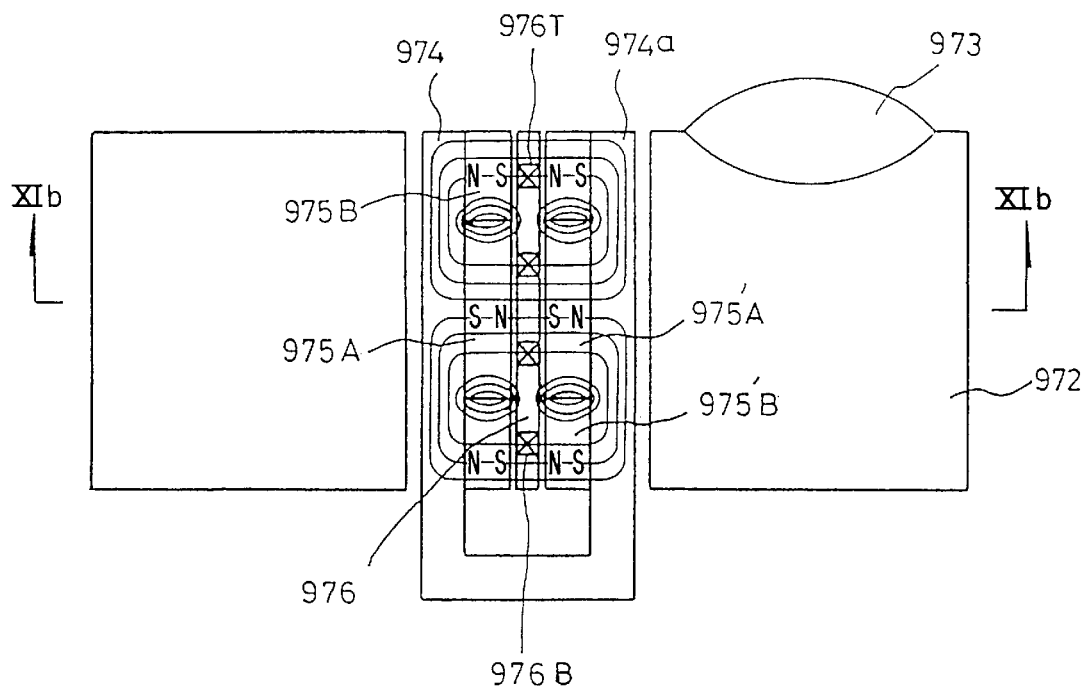
FIG. 11A is a cross-sectional view illustrating an actuator according to a ninth embodiment of the present invention.
Figure 11B:
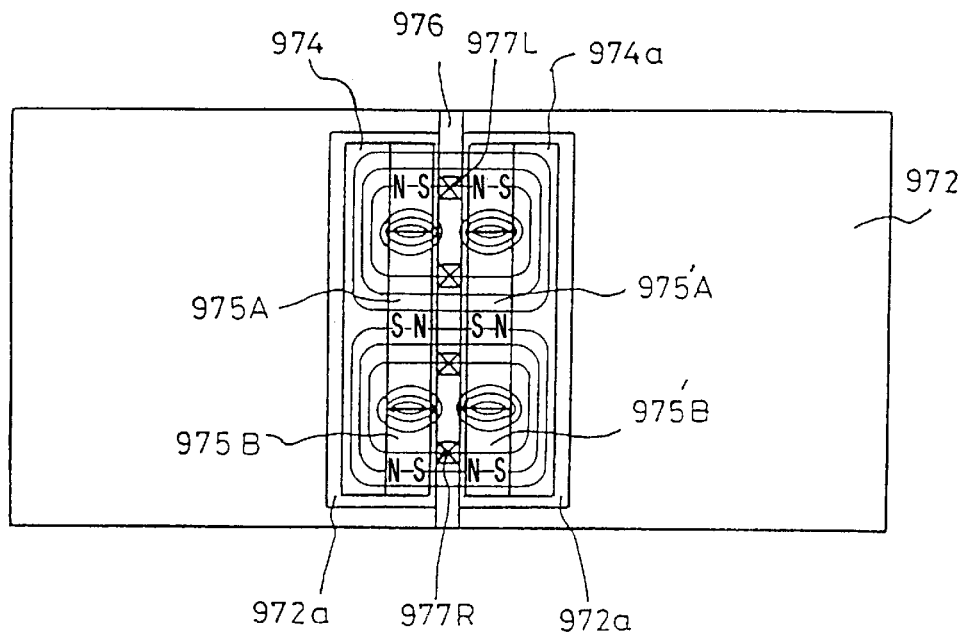
FIG. 11B is a cross-sectional view taken along line XIb—XIb of FIG. 11A.

First, as shown in FIGS. 11A and 11B, an FP (Fine Pattern) coil 976 is arranged in a groove 972a formed in the weight center of a bobbin 972. Focusing coils 976T and 976B and tracking coils 977L and 977R are arranged in the same plane. Here, the focusing coils 976T and 976B are vertically wound, and the tracking coil 977L and 977R are horizontally wound. An objective lens 973 is disposed in the bobbin 972.

In addition, center portions of the permanent magnets 975A and 975'A and regions of the permanent magnets 975B and 975B' surrounding the center portions thereof are formed in two back yokes 974 and 974a positioned in the groove 972a formed in the bobbin 972 and being opposite to the FP coil 976.

The poles of the permanent magnets are different from one another in the center portions of the permanent magnets 975A and 975A' and the peripheral portions of the permanent magnets 975B and 975B' surrounding the center portions thereof.

The poles being opposite to one another with respect to the FP coil 976 are different in the center portions of the permanent magnets 975A and 975A' and the peripheral portions of the permanent magnets 975B and 975B'.

Here, the center portion of the permanent magnet 975A is formed in rectangular shape, and the N-pole is arranged toward the FP coil 976, and the center portion of the permanent magnet 975A' is arranged in order for the S-pole to be arranged toward the FP coil 976. In the peripheral portion of the permanent magnet 975B, the S-pole is arranged toward the FP coil 976, and in the peripheral portion of the permanent magnet 975B', the N-pole is arranged toward the FP coil 976.

In addition, the focusing coils 976T and 976B and the tracking coils 976L and 976R are arranged in a portion matching with the boundary between the center portions of the permanent magnets 975A and 975A' and the peripheral portions of the permanent magnets 975B and 975B' surrounding the center portions of the permanent magnets 975A and 975A'.

Here, the ninth embodiment of the present invention is directed to using one FP coil 976 in which the tracking coils 977L and 977R and the focusing coils 976T and 976B are arranged in the groove 972a ofthe center portion of the bobbin 972.

Left and right sides of the FP coils 976 are attached to both edge portions of the groove 972a of the center portion of the bobbin 972, and the focusing coils 976T and 976B and the tracking coils 977L and 977R are opposite to the center portions of the permanent magnets 975A and 975A'.

The operation principle of the ninth embodiment of the present invention is the same as the third embodiment except that the magnetic flux lines are formed through the left side back yoke 974, the left side permanent magnets 975A and 975B, the FP coil 976, the right side permanent magnets 975A' and 975B', and the right side back yoke 974a.

In the ninth embodiment of the present invention, the focusing coils and the tracking coils are arranged in the same plane, and then the focusing and tracking operations are performed by using one FP coil disposed in the center portion of the bobbin, for thus increasing the usage efficiency of the tracking coils. In addition, since the focusing coils and tracking coils are wound in the same plane, it is possible to reduce the length of the effective air gap, for thus increasing the average magnetic flux density.

In addition, in the actuator for an optical pickup apparatus according to the present invention, the coil winding shape and the shape of the magnetic flux formation section may be preferably made different as another embodiment of the present invention. Moreover, the salient pole may be used for various combinations of the present invention.

As described above, four permanent magnets are alternately arranged on the back yoke in order for the poles thereof to be alternately formed. In addition, since the focusing coils and tracking coils are arranged in rectangular form in the same plane so that the center portion thereof is positioned in a portion matching with the boundary between the permanent magnets, whereby it is possible to obtain portions which are used for the tracking as much as two times compared to the conventional art. In addition, the length of the air gap is reduced, and the average magnetic flux density is increased.

In addition, in the present invention, since the inner back yoke is not necessary the number of parts is reduced.

Moreover, the actuator for an optical pickup apparatus according to the present invention includes the center portions of the permanent magnets in which poles are different from one another, and regions surrounding the permanent magnets and focusing coils and tracking coils which are wound in the same plane in a portion matching with the boundary between the center portion of the permanent magnets and the region surrounding the permanent magnets in square or trapezoid forms, so that the length the tracking coils which are used for the tracking is extended two times compared to the conventional art, for thus increasing the usage efficiency of the tracking coils, and enhancing the tracking operation.

In addition, since the focusing coils and tracking coils are arranged in the same plane, the length of the effective air gap is made shorter, for thus increasing the average magnetic flux density passing through the coils, and enhancing the tracking and focusing operations.

Furthermore, instead of the permanent magnets, the salient pole may be used. In addition, the inner back yoke is removed in the present invention, for thus reducing the weight of the bobbin and the number of parts, so that it is possible to enhance the reliability of the apparatus.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An actuator for an optical pickup apparatus, comprising:
   a passing-through groove formed in a center portion of a bobbin having an objective lens;
   focusing coils and tracking coils arranged in a same plane in said passing-through groove and attached to the bobbin;
   a back yoke being opposite to said focusing coils and tracking coils; and
   permanent magnets having poles which are alternately arranged toward said focusing coils and tracking coils of said back yoke.

2. The actuator of claim 1, wherein said permanent magnets are opposite to said back yoke and are rectangularly arranged in order for different poles to neighbor with each other.

3. The actuator of claim 1, wherein said focusing coils and tracking coils are rectangularly wound, with centers thereof being positioned matching with boundaries between said permanent magnets.

4. An actuator for an optical pickup apparatus, comprising:
   a bobbin having an objective lens;
   permanent magnets having a first pole and a second pole surrounding the first pole; and
   a back yoke attached to said permanent magnets and being opposite to focusing coils and tracking coils,
   the focusing coils being arranged in upper and lower portions of both sides of said bobbin, and
   the tracking coils being arranged at both sides of said bobbin, wherein the focusing coils and the tracking coils are arranged in a same plane.

5. The actuator of claim 4, wherein the first and second poles are arranged toward said bobbin in order for different poles to be arranged toward said bobbin.

6. The actuator of claim 4, wherein the first pole is provided by a first rectangular permanent magnet, and the second pole is provided by a second rectangular permanent magnet having a rectangular through hole in which the first rectangular permanent magnet is located.

7. The actuator of claim 6, wherein the first rectangular permanent magnet has an N-pole arranged toward said bobbin, and the second rectangular permanent magnet has an S-pole arranged toward said bobbin.

8. The actuator of claim 4, wherein the focusing coils and the tracking coils are wound at both sides of said bobbin in square shape in order for center portions thereof to be positioned matching with boundaries between the first pole and the second pole.

9. The actuator of claim 4, wherein the focusing coils and the tracking coils are wound at both sides of said bobbin with trapezoidal shape in order for center portions thereof to be positioned matching with boundaries between the first pole and the second pole.

10. The actuator of claim 9, wherein said trapezoidal shape focusing coils and tracking coils are wound in order for longer sides thereof to be arranged in an outer portion of said bobbin.

11. The actuator of claim 4, wherein the first pole is a salient pole, and the second pole is a rectangular permanent magnet surrounding the salient pole.

12. The actuator of claim 11, wherein said back yoke having the first pole is protrudingly bent.

13. The actuator of claim 4, wherein the first pole is a permanent magnet, and the second pole is a salient pole disposed in said back yoke which is protrudingly bent.

14. An actuator for an optical pickup apparatus, comprising:
  a bobbin having a groove internally formed in both ends thereof;
  a first pole arranged in a center portion of a back yoke;
  a second pole arranged in the back yoke and surrounding said first pole;
  focusing coils arranged in upper and lower portions of both sides of said bobbin;
  tracking coils arranged in both sides of said bobbin, with said focusing coils and said tracking coils being arranged in a same plane; and
  an inner back yoke disposed in each groove formed in said bobbin.

15. The actuator of claim 14, wherein said first and second poles are arranged in order for different poles to be arranged toward said bobbin.

16. The actuator of claim 14, wherein said first pole is provided by a first rectangular permanent magnet, and said second pole is provided by a second rectangular permanent magnet having a rectangular through hole with the first rectangular permanent magnet arranged therewithin.

17. The actuator of claim 14, wherein said focusing coils and said tracking coils are wound at both sides of said bobbin in rectangular shape in order for centers of said focusing coils and said tracking coils to be positioned matching with boundaries between said first pole and said second pole.

18. The actuator of claim 17, wherein said focusing coils and said tracking coils are an integrally formed fine pattern coil, both ends of which are attached to both sides of said bobbin and are directly opposite to said inner back yoke.

19. The actuator of claim 14, wherein said focusing coils and said tracking coils are wound at both sides of said bobbin in trapezoidal shape in order for centers of said focusing coils and said tracking coils to be positioned matching with boundaries between said first pole and said second pole.

20. The actuator of claim 14, wherein said first pole is a salient pole, and said second pole is a rectangular permanent magnet surrounding the salient pole.

21. The actuator of claim 20, wherein the back yoke having said first pole is protrudingly bent.

22. The actuator of claim 14, wherein said first pole is a permanent magnet, and said second pole is a salient pole disposed in the back yoke which is protrudingly bent.

23. The actuator of claim 14, wherein said inner back yoke is formed of a magnetic material and is fixed to the back yoke.

24. An actuator for an optical pickup apparatus, comprising:
  a bobbin having an objective lens and a groove formed in the weight center thereof;
  a fine pattern coil disposed in the groove of said bobbin and having focusing coils and tracking coils which are arranged in a same plane;
  back yokes arranged in the groove of said bobbin and being opposite to said fine pattern coil; and
  permanent magnets having first poles attached to portions opposite to said fine pattern coil of said back yokes and second poles which are different from the first poles and which surround the first poles.

25. The actuator of claim 24, wherein the first poles are formed by first rectangular permanent magnets having N-poles arranged toward said fine pattern coil, and the second poles are second rectangular permanent magnets having the S-poles arranged toward said fine pattern coil.

26. The actuator of claim 24, wherein the focusing coils and the tracking coils are wound in rectangular shape matching with boundaries between the first poles and the second poles.

27. The actuator of claim 24, wherein the focusing coils and the tracking coils are wound in trapezoidal shape matching with boundaries between the first poles and the second poles.

28. The actuator of claim 24, wherein the first poles and the second poles are formed in center portions of said bobbin in twin shape, with left and right sides thereof in the twin shape being arranged in said fine pattern coil attached to both edge portions of said bobbin and being arranged to be directly opposite to the first and second poles.

29. The actuator of claim 24, wherein magnetic flux lines generated by the first and second poles are arranged in loop form through a left side back yoke, left side first and second poles, said fine pattern coil, right side first and second poles, and a right side back yoke.

30. The actuator of claim 24, wherein the first poles and the second poles are arranged in order for different poles to be arranged toward said bobbin.

31. The actuator of claims 24, wherein the first poles are salient poles, and the second poles are rectangular permanent magnets surrounding the salient poles.

32. The actuator of claim 31, wherein said back yokes having the first poles are protrudingly bent.

33. The actuator of claim 24, wherein the first poles are permanent magnets, and the second poles are salient poles disposed in said back yokes that are protrudingly bent.

* * * * *